(12) United States Patent
Busch et al.

(10) Patent No.: US 10,614,495 B2
(45) Date of Patent: Apr. 7, 2020

(54) ADAPTIVE AND TUNABLE RISK PROCESSING SYSTEM AND METHOD

(71) Applicant: Experian Health, Inc., Franklin, TN (US)

(72) Inventors: Christopher G. Busch, Maple Grove, MN (US); Danny Roy Buell, Jr., Denver, CO (US); Nathaniel W. Lutz, Eagan, MN (US); Zackary N. Dixon, Austin, TX (US); Rich Lucas, Austin, TX (US); Colin Kriwox, Cornwall, VT (US); Stephanie Wentland, Maple Grove, MN (US)

(73) Assignee: EXPERIAN HEALTH, INC., Franklin, TN (US)

( * ) Notice: Subject to any disclaimer, the term of this patent is extended or adjusted under 35 U.S.C. 154(b) by 333 days.

(21) Appl. No.: 15/190,157

(22) Filed: Jun. 22, 2016

(65) Prior Publication Data

US 2017/0372389 A1 Dec. 28, 2017

(51) Int. Cl.
*G06Q 30/06* (2012.01)
*G06Q 40/00* (2012.01)
(Continued)

(52) U.S. Cl.
CPC ..... *G06Q 30/0609* (2013.01); *G06Q 10/0635* (2013.01); *G06Q 10/06314* (2013.01);
(Continued)

(58) Field of Classification Search
CPC .... G06Q 30/0609; G06Q 50/18; G06Q 40/12; G06Q 10/063112; G06Q 10/063114; G06Q 10/0635; G06Q 10/06395; G06Q 10/06393
(Continued)

(56) References Cited

U.S. PATENT DOCUMENTS 6,912,502 B1 * 6/2005 Buddle ............ G06Q 10/06395
705/7.41
7,546,268 B1 * 6/2009 DiGiovanni ........... G06Q 40/00
705/35
(Continued)

FOREIGN PATENT DOCUMENTS

IN 2012-K80248 * 8/2012 ............. G06Q 10/06

OTHER PUBLICATIONS

Sexton, Christine Jordan, "Fla. moves closer to licensing viatical industry"; Sep. 9, 1996, Published in National Underwriter Life & Health-Financial Services Ed; Media. ; extracted from Dialog Solutions on Nov. 18, 2019.*

*Primary Examiner* — Yogesh C Garg
(74) *Attorney, Agent, or Firm* — Merchant & Gould

(57) ABSTRACT

Aspects described herein pertain to the use of an adaptive and tunable processing system and method to provide a risk assessment and compliance analysis, but are not so limited. An adaptive and tunable processing system of an embodiment adaptively determines an amount of compliance and/or risk based on one or more quantification variables, including one or more of a litigation category variable, a licensing category variable, and/or a consumer sentiment category variable, to generate a stratified score that quantifies an amount of compliance and/or risk associated with a particular entity. The system of an embodiment uses one or more adaptive filters tuned to output values corresponding to an amount of compliance and/or risk associated with use of a particular entity to perform a service or services.

18 Claims, 9 Drawing Sheets

(51) Int. Cl.
*G06Q 50/18* (2012.01)
*G06Q 10/06* (2012.01)

(52) U.S. Cl.
CPC . *G06Q 10/06393* (2013.01); *G06Q 10/06395* (2013.01); *G06Q 10/063112* (2013.01); *G06Q 40/12* (2013.12); *G06Q 50/18* (2013.01)

(58) Field of Classification Search
USPC ................. 705/26.35, 7.28, 7.14, 7.39, 7.41
See application file for complete search history.

(56) References Cited

U.S. PATENT DOCUMENTS

| | | | | |
|---|---|---|---|---|
| 7,640,165 | B2* | 12/2009 | Mukund | G06Q 10/109 705/1.1 |
| 9,245,299 | B2* | 1/2016 | Riggs | G06F 17/30601 |
| 2003/0055669 | A1* | 3/2003 | Ryan | G06Q 10/10 705/1.1 |
| 2006/0149604 | A1* | 7/2006 | Miller | G06Q 10/067 705/348 |
| 2013/0191157 | A1* | 7/2013 | Eiden | G06Q 50/24 705/3 |
| 2014/0081652 | A1* | 3/2014 | Klindworth | G06Q 10/10 705/2 |
| 2015/0112744 | A1* | 4/2015 | Neuweg | G06Q 10/0637 705/7.14 |

* cited by examiner

ADAPTIVE AND TUNABLE RISK PROCESSING SYSTEM AND METHOD

BACKGROUND

Risk analysis is a tool that can be used when determining an amount of risk associated with using or performing a particular process to quantify some end result. For example, a risk analysis algorithm can be used to quantify an amount of computational risk when using one type of computer processing architecture to perform a particular function as compared to a different type of computer processing architecture to perform the same function. Each computer processing architecture may have operational trade-offs such as processing efficiency versus processing power that may affect the risk analysis outcome.

Risk analysis can also be used to assess actions, behaviors, and adherence to both State and Federal laws employed by a collection agency to collect on debts for another party, such as a healthcare provider for example, to quantify potential financial and reputational risk for the healthcare provider. Unfortunately, healthcare providers have limited resources to screen or audit collection agencies for various compliance matters. Experts are typically employed to look into the compliance matters. There is a need in the healthcare industry to more professionally select, regulate, and manage quality vendors without having to hire an expert who may employ outdated and expensive risk assessment techniques. In many cases, the healthcare providers are unaware of risks involved with available debt collection vendors and how to tell if a particular vendor operates using the proper standards.

SUMMARY

The present disclosure describes aspects of using an adaptive and tunable processing system and method to provide a risk assessment and/or compliance analysis, but is not so limited. An adaptive and tunable processing system of an embodiment adaptively determines an amount of compliance and/or risk based on one or more quantification variables, including one or more of a litigation category variable, a licensing category variable, and/or a consumer sentiment category variable, to generate a stratified score that quantifies an amount of compliance and/or risk associated with a particular entity. The system of an embodiment uses one or more adaptive filters tuned to output values corresponding to an amount of compliance and/or risk associated with use of a particular entity to perform a service or services.

This summary is provided to introduce a selection of concepts; it is not intended to identify all features or limit the scope of the claimed subject matter.

BRIEF DESCRIPTION OF THE DRAWINGS

The accompanying drawings, which are incorporated in and constitute a part of this disclosure, illustrate various aspects and examples of the present invention.

DETAILED DESCRIPTION

Figure 1:
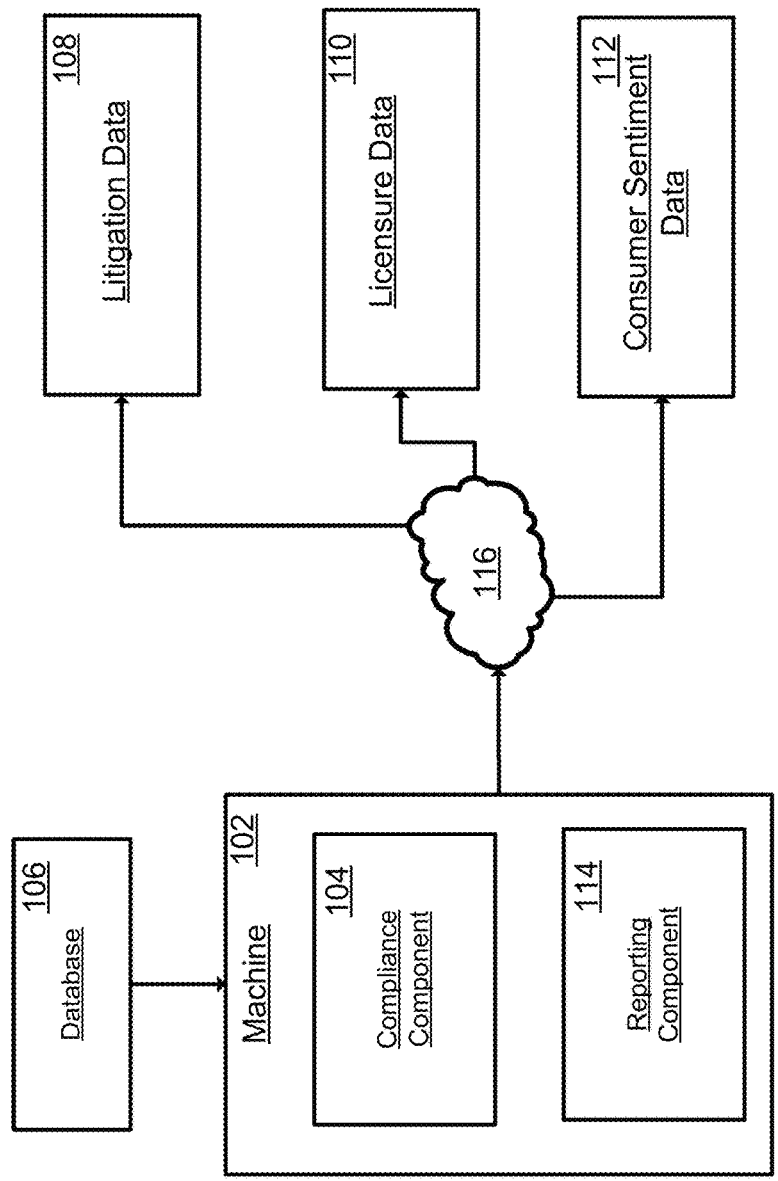
FIG. 1 is a block diagram that depicts a high-level view of a tunable system for adaptively providing a risk assessment and/or compliance analysis.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, subtracting, and/or adding operations to the disclosed methods. Accordingly, the following detailed description does not limit the present disclosure, but instead, the proper scope of the present disclosure is defined by the appended claims. The following detailed description is, therefore, not to be taken in a limiting sense.

FIG. 1 is a block diagram that depicts a high-level view of a tunable system 100 for adaptively providing a risk assessment and/or compliance analysis, according to an embodiment. It will be appreciated that modern complex computer and communication architectures include a variety of hardware, software, and/or firmware that provide networked communication functionality to devices, systems, applications, etc. As shown in FIG. 1, the system 100 includes a machine 102 that includes functionality used to provide a compliance and/or risk assessment regarding the use of one or more entities to perform a particular service, but is not so limited.

The machine 102 of an embodiment includes a risk assessment or compliance component 104 that uses one or more adaptive filters with a plurality of compliance and/or risk assessment variables or factors to quantify an amount of compliance and/or risk regarding the use of one or more entities to perform a particular service. The one or more adaptive filters can be used to improve the performance of machine 102 and/or associated software by adaptively focusing the compliance and/or risk determinations according to particular categories of interest.

As one example, the system 100 can be used to evaluate the risk of using one or more collection agencies in the healthcare space according to a programmed executable or executables that uses tunable compliance and/or risk variables to facilitate a stratification of the various collection agencies. The system 100 can compile and use one or more of licensure factors, financial factors, operational factors, consumer sentiment (e.g., complaints) factors, and/or litigation factors to provide a compliance and/or risk assessment for each entity being analyzed. The particular compliance and/or risk assessment factors allow the compliance component 104 to efficiently provide compliance and/or risk scores without requiring processing of extraneous variables and/or other potentially time-consuming determination factors.

The system 100 can collect litigation information by searching a third party source for the litigation information associated with an entity based on use of a registered agency name of the entity including a previously registered company name if available or a company alias including a doing-business-as name if available. The system 100 can associate an entity with litigation information by: removing duplicates based on a court case number, ranking defendants based on order in a defendant list or lists, matching the litigation information based on the registered agency name of the entity, and/or maintaining a database of entities comprising collection agencies with associated litigation.

The system 100 can also search a state source for licensure information associated with an entity based on use of a registered agency name of the entity including a previously registered company name if available or a company alias including a doing-business-as name if available. The system 100 can then operate to select a single license for each licensing state (except in states that have multiple licensing requirements at the state and/or city level) by selecting the single license according to rules that include: determining if a name of an entity matches the registered agency name associated with the single license and assigning a highest priority for a match, determining a most recent license start date of an active license status associated with the single license, and/or determining a highest ranked license number associated with the single license in descending order and assigning a lowest priority for the highest ranked license number.

The system 100 can also search a third party source for consumer sentiment information associated with an entity including one or more complaints directed at the entity based on use of a registered agency name including a previously registered company name if available or a company alias including a doing-business-as name if available. The system 100 can compile and use demographic information for a patient/guarantor, entity payment and/or balance data, and/or contact data associated with collection of a debt or account. A method and computer readable medium of performing a compliance and/or risk assessment tracks the operation of system 100 and processes 200 and 300 described below.

According to one embodiment, the machine 102 can use the compliance component 104 that utilizes a quantification algorithm (see FIGS. 2 and 3) configured to output compliance and/or risk assessment scores that correspond to an amount of risk that may be associated with using a particular collection agency to attempt to collect an outstanding debt or account for a healthcare provider. The higher a compliance score, the less risk may be involved with using a particular collection agency. Likewise, a lower risk assessment score corresponds to higher risk that may be involved with using a particular collection agency to collect a debt.

Since a healthcare provider reputation and associated goodwill may be tied to how an account is pursued by a particular collection agency, the risk assessment or compliance score can be used as a benchmark to ensure that the healthcare provider does not damage its reputation or goodwill, which could potentially lead to a loss of clients. As described further below, the plurality of compliance and/or risk assessment variables can include a litigation variable, a licensure variable, and/or a sentiment or complaint variable, but are not so limited. The use of the litigation variable, licensure variable, and/or the sentiment variable by the quantification algorithm of the compliance component 104 tends to provide an accurate compliance and/or risk assessment when determining which collection agency to use to collect an outstanding debt or account.

The quantification algorithm of an embodiment utilizes a weighted sum of variables to provide an overall compliance rank score, wherein each weighted variable can be attributed to a litigation category, a licensing category, and/or a consumer sentiment category, but is not so limited. For example, the quantification algorithm can utilize a sum of a first weight applied to a litigation factor, a second weight applied to a licensure factor, and a third weight applied to a consumer sentiment factor to provide an overall compliance rank score.

Balancing of the categories of litigation, licensing, and consumer sentiment may include assigning initial level weightings to each category to account for an initial level of importance and/or availability and/or amount of data. The weightings on overall categories and/or sub-categories can be adjusted to tune the quantification algorithm and/or one or more adaptive filters as more data are accumulated (or discarded) and assessed by the compliance component 104. For example, one model may assign equal weights to each of the categories for an initial compliance and/or risk assessment whereas a different model assigns higher weights to the litigation and licensing categories and a lower weight to the consumer sentiment category. It will be appreciated that different weights and/or categories can be used according to each compliance and/or risk assessment modeling implementation.

Additionally, each risk category can be composed of individual aspects or sub-categories, each with its own initial level of importance in the context of each particular category. For example, an initial level of importance for each category of a particular risk assessment model can be set by a subject matter expert or other user and adjusted over time as new information arises and is fed back into the system 100. The quantification algorithm can use additional factors or coefficients depending on how much information is available for a particular entity. For example, a weighting assigned to the licensing category may be adjusted or tuned to affect an overall compliance and/or risk assessment score if a collection agency directly collected (or did not collect) from a consumer in an unlicensed state. Likewise, a weighting assigned to the litigation category may be adjusted or tuned to affect an overall risk assessment score if a collection agency has been named as a defendant in multiple or few court cases.

A compliance and/or risk assessment score can take into account all or some portion of licensure, litigation, and/or sentiment/complaint data for a particular collection agency without limiting the score to only healthcare and/or medical branches. As discussed below, additional licensure, litigation, and/or sentiment/complaint data for the other categories can have different factors or coefficients assigned depending on how much the other categories apply to the healthcare branch and their practices. For example, the quantification algorithm may include additional variables that account for other departments of a particular collection agency to be included in the overall risk assessment score (potentially with a reduced effect). Each of the individual aspects of a particular collection agency can be computed as a cumulative percentage and compared to peer agencies, ranging from bad (low rating) to good (high rating).

Since regional concerns can be of significance in the healthcare space, in addition to the above being calculated on a nationwide basis, each computation can be performed on a per state basis and tracked longitudinally over time. The per state compliance and/or risk assessment score can be balanced with the overall nationwide risk assessment score through the weight of information determined for each state (see FIG. 3). The nationwide score is leveraged more when there is less evidence in a given state. Accordingly, healthcare providers are able to focus on vendors that perform well in their home regions while providing valuable insight in how to safely assign accounts to each specific entity.

As shown in FIG. 1, the machine 102 also includes a reporting component 114 configured to provide a reporting output regarding the compliance and/or risk assessment provided by the compliance component 104. The reporting component 114 of an embodiment provides an output broken out into four (4) components: a calculated risk score, a licensing status of active inventory, current and recent litigation filed, and current and recent complaints for each collection agency.

The reporting component 114 is also configured to output a nationwide compliance risk score for an entity, a state and/or regional compliance risk score for the entity, individual key factors influencing each of the compliance risk scores for the entity, and/or at least one sub-score associated with the litigation information, at least one sub-score associated with the licensure information, and/or at least one sub-score associated with the consumer sentiment information. The reporting component 114 is also configured to output a historical compliance and/or risk report that displays the longitudinally tracked aspects according to the four components. Output from the reporting component 114 can be used to drive a number of graphical displays (see FIGS. 6-8), described further below.

In order to aggregate the compliance and/or risk assessment data, the machine 102 operates to search each state source (e.g., a website, a pdf file, an excel file, etc.) for information according to the registered agency name or a company alias, which could include a doing-business-as name or previously registered company name. The search selects one and only one license for each state, except in states that have multiple licensing requirements at the state and/or city level (e.g. New York and Illinois). A set of tie-breaker rules are used to accurately choose the related information. According to one embodiment, the tie-breaker rules include determining if a name of a collection agency matches the registered agency name associated with the single license and assigning a highest priority for a match, determining a most recent license start date of an active license status associated with the single license, and/or determining a highest ranked license number associated with the single license in descending order and assigning a lowest priority for the highest ranked license number.

As used herein, the term "machine" refers to a physical article such as various endpoint systems and/or devices that use networked communication functionality to communicate and/or transfer data. Exemplary systems and/or devices may include a desktop or laptop computer, a tablet computer, a network access device, a memory storage device, etc. According to one functional implementation, a machine includes, but is not limited to having, a power supply, power control circuitry to control and regulate use of an external or internal power supply, processing and/or memory resources, such as a central processing unit, microprocessor, etc., advanced integrated circuitry, graphics processing hardware, networking hardware for wired and/or wireless configurations, an operating system, screen or display, I/O components, etc.

With continuing reference to FIG. 1, the exemplary system 100 includes a database 106 coupled to machine 102 which is used to store compliance and/or risk quantification data and/or other information associated with providing compliance and/or risk scores and/or assessments. For example, database 106 can be configured as a relational database to store output from the compliance component 104, weightings used by the quantification algorithm, output of the reporting component 114, and/or information associated some other component or components. While shown separately, the database 106 can be integrated with the machine 102 or some other component of system 100.

Litigation data 108, licensure or licensing data 110, and consumer sentiment or complaint data 112 are gathered and used by the compliance component 104 when providing compliance and/or risk quantification data for use in determining whether to use a particular collection agency to pursue one or more outstanding accounts. For example, the machine 102 can pull in the litigation data 108, licensure data 110, consumer sentiment data 112, and/or other information from a file, website, or other resource when preparing to quantify compliance and/or risk for one or more entities, such as when determining which collection agency to use from a plurality of available collection agencies. As described below, as more data are collected and/or output by the system 100, the additional compliance and/or risk quantification data can be fed back into the system 100 to tune the operation of the system 100.

According to an embodiment, each compliance and/or risk score output by the compliance component 104 comprises a stratified aggregated value based on a weighted sum of the litigation data 108, licensure data 110, and/or consumer sentiment data 112, but is not so limited. As discussed briefly above, the weights can be adjusted and the quantification algorithm and/or one or more adaptive filters tuned as additional litigation data 108, licensure data 110, and/or consumer sentiment data 112 is collected or discarded. For example, the compliance component 104 operates to adaptively output a compliance and/or risk score for each collection agency on a state by state, regional, and/or nationwide basis based on one or more weighted litigation variables or factors, licensing variables or factors, and/or complaint variables or factors.

According to an embodiment, the compliance component 104 includes programmatic instructions stored in memory or on a disk of machine 102 which are used when quantifying an amount of compliance and/or risk for determining whether to use an entity to perform a particular service. For example, a processor or processing unit of machine 102 can be used to execute the programmatic instructions stored in a memory storage device or other component in order to provide compliance and/or risk determinations or scores.

As discussed above, the compliance component 104 can use the programmatic instructions and various categorical inputs to adaptively provide compliance and/or risk assessment determinations. A compliance and/or risk assessment determination can be used when determining which entity, such as a collection agency for example, to use for collecting one or more debts or accounts receivable. Upon powering up and establishing a communication session via network(s) 116, machine 102 can collect data for input to the compliance component 104 in order to quantify compliance and/or risk associated with use of a particular entity to perform a service or services. Compliance and/or risk parameters and data updates can be stored locally in database 106 or machine 102 and/or remotely in some other medium or system.

Network(s) 116 can include a local area network (LAN) (e.g., a company Intranet), a wide area network (WAN) (e.g., the Internet or the World Wide Web), accessed via a variety of couplings or connections and/or protocols including, but not limited to, landlines, LAN or WAN links (e.g., 802.11, T1, T3, 56 kb, X.25, etc.), broadband connections (e.g., ISDN, Frame Relay, ATM, etc.), HTTP, ICA, TCP/IP, IPX/SPX, NetBIOS, Ethernet, RS232, direct asynchronous connections, wireless connections, etc.

Exemplary systems and/or devices include a workstation or terminal computer, a desktop computer, a server computer, a laptop computer, a tablet computer, other handheld computer types, mobile telephone, or other form of processing and/or telecommunications device/system capable of communication to perform the various adaptive compliance and/or risk processing operations described herein.

Figure 2:
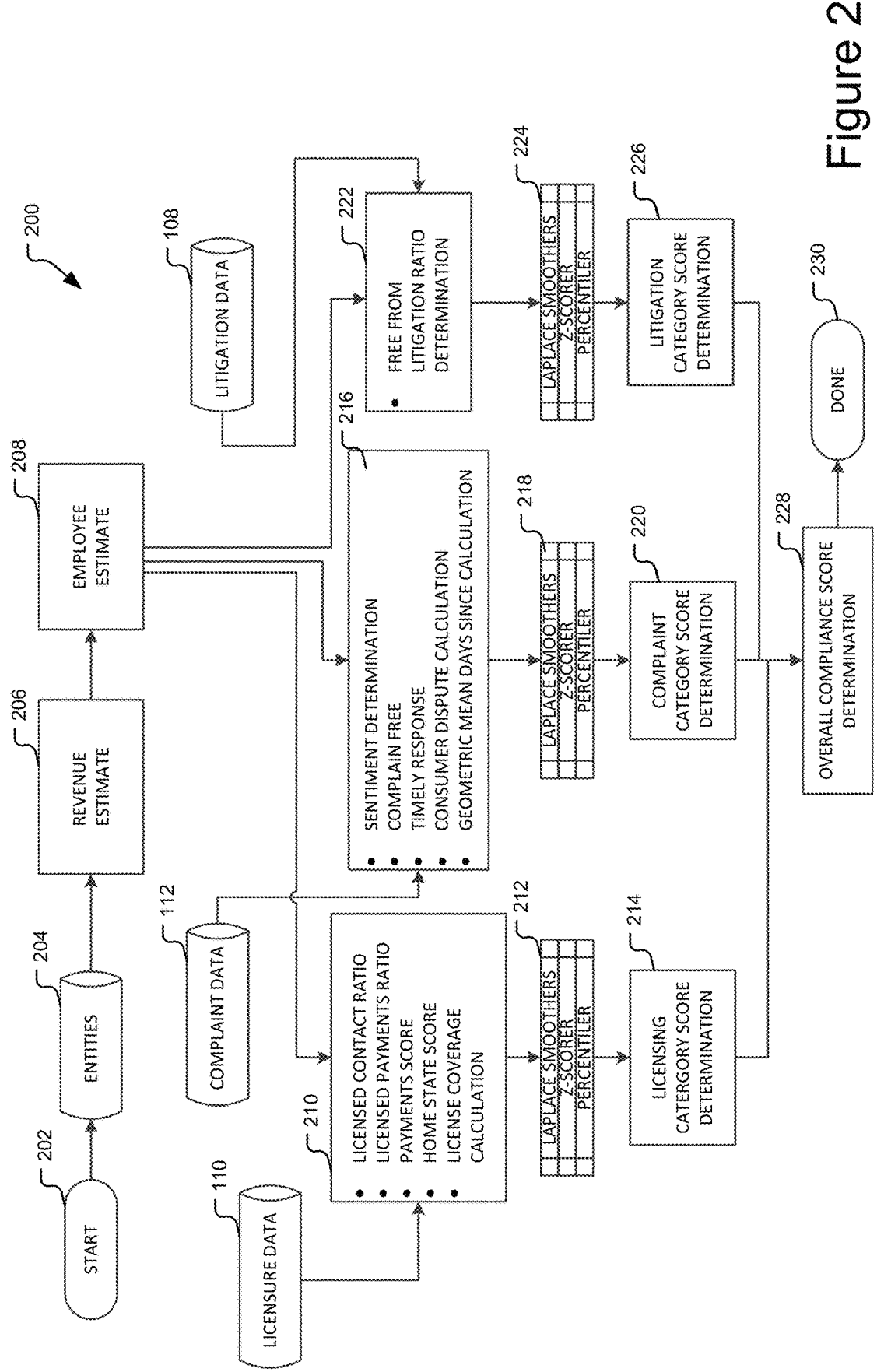
FIG. 2 is flow diagram that depicts a process of adaptively quantifying an amount of compliance and/or risk associated with a plurality of entities according to an embodiment.

FIG. 2 is flow diagram that depicts a process 200 of adaptively quantifying an amount of compliance and/or risk associated with use of one or more of a plurality of entities according to an embodiment. For example, process 200 can be used to adaptively process narrowly focused categories of information to determine whether to use a collection agency to pursue an outstanding account from a plurality of available collection agencies.

The process 200 at 202 of an embodiment begins when a machine (e.g., machine 102) is powered up, establishes a network connection, connects to one or more networks (e.g., network(s) 116), and then proceeds to 204 where entity data are collected from various sources (e.g., electronic and/or hard copy sources). The entity data are initially used to provide a plurality of category sub-scores as part of determining overall compliance and/or risk assessment scores for entities being considered to perform a particular service or services. For example, the process 200 can operate to extract data from a website, file, or other source for use in the compliance and/or risk assessment analysis when determining which collection agency to use to collect a debt or pursue an outstanding account.

At 206, the process 200 operates to provide a revenue estimate for each of the entities. For example, the process 200 at 206 can use extracted account receivable data to determine a profitability value associated with each entity based on accounts that remain outstanding and uncollected as compared to accounts that have been paid up partially or in full and have minimal or zero balances.

At 208, the process 200 operates to provide an estimate of a number of employees of each entity. The number may be an actual employee count as provided by an associated entity or available from a website or other resource, and/or based on an estimate according to a number of offices or locations associated with each entity. The employee count or estimate can be used as a standardizing factor in the process 200 when analyzing various risk categories, such as litigation risk, licensing risk, and/or consumer sentiment risk for example. For example, a number of consumer complaints can be standardized by taking the number of consumer complaints associated with an entity and dividing by the estimated number of employees for that entity to standardize an output value or score.

At 210, the process 200 uses collected license data, account receivable data, and/or the employee estimate to output one or more sub-scores or values including a licensed contact ratio value, a licensed payments ratio value, a payments score, a home state score, and/or a license coverage calculation value. For example, the license data and/or account receivable data can be pulled and collected from an online state license database, an entity website, a file, etc. to determine one or more of the licensed contact ratio, the licensed payments ratio, the payments score, the home state score, and/or the license coverage calculation. The licensed contact ratio value, licensed payments ratio value, payments score, home state score, and/or license coverage calculation value of one embodiment uses account receivable data that are tied to geographic areas in which there are different regulatory licensing requirements to determine which collection efforts do not comport with licensing requirements nationally and/or at a state level.

At 212, the process 200 of an embodiment uses one or more adaptive filters that use one or more of a Laplace smoothing algorithm, a Z-scoring algorithm, and/or a percentiler algorithm to output a licensing category score determination at 214 for each entity.

The Laplace smoothing algorithm of one embodiment is configured to smooth ratio variables using adjusters alpha and beta, such that:

$$x = (\text{alpha} + \text{numerator})/(\text{beta} + \text{denominator}),$$

where the denominator is the total count of the population under inspection and the numerator is the quantity being measured. A higher beta tuning parameter is chosen as a Laplace smoothing factor to protect against minimal data. The alpha tuning parameter is chosen as a value of prior information. If numeric value ranges from bad to good then the Z-scoring algorithm and percentiler algorithm are used to calculate the score as:

$$\text{score} = \max(1, \min(999, \text{round}(1000*((p\text{norm}((x - \text{mean}(x))/sd(x))))))$$

where sd is the standard deviation.

If the numeric value ranges from good to bad then the Z-scoring algorithm and percentiler algorithm are used to calculate the score as:

$$\text{score} = \max(1, \min(999, \text{round}(1000*(1 - (p\text{norm}((x - \text{mean}(x))/sd(x))))))$$

As described below, the licensing category score determination is used by the compliance component 104 to determine an overall compliance score for each entity at 228.

At 216, the process 200 uses collected complaint data and/or the employee estimate to output one or more sub-scores including a sentiment determination value, a complaint free value, a time of responsiveness value, a consumer dispute calculation value, and/or a geometric mean value associated with an amount of time (e.g., days, weeks, etc.) since the consumer dispute calculation. For example, the complaint data can be pulled from an online database (e.g., Better Business Bureau and/or Consumer Financial Protection Bureau), an entity or third party website (e.g., consumer comments), a file, etc.

According to an embodiment, the consumer sentiment is calculated as a score measured through a series of metrics that include a complaint negativity value, a complaint load value, a timely responsiveness ratio, a timely responsiveness ratio, and/or a geometric mean of an outstanding complaints age value. The calculated consumer sentiment score of one embodiment is factored into a weighted sum calculation to weigh the evidence to generate a corresponding score.

In one embodiment, the complaint negativity is determined by matching each complaint according to a list of negative sentiment words. For example, negative sentiment words can be associated with disparaging and other negative comments. A list or table of negative words and/or synonyms can be used to identify negative comments. The proportion of negative complaints to overall complaints (a negative attribute) is made positive by:

Complaint negativity=1−(negative_complaints/overall_complaints)

The complaint load calculation of one embodiment is determined based on the number of overall complaints divided by the employee estimate value.

The timely responsiveness ratio of one embodiment is determined based on an amount of time to respond to each complaint divided by the employee estimate value.

At 218, the process 200 uses one or more adaptive filters (discussed above) that use one or more of a Laplace smoothing algorithm, a Z-scoring algorithm, and/or a percentiler algorithm to output a complaint category score determination at 220 for each entity being analyzed. As described below, the complaint category score determination is used by the compliance component 104 to determine the overall compliance score for each entity at 228.

At 222, the process 200 uses collected litigation data and/or the employee estimate to output at least one sub-score including a litigation ratio determination value based on the number of lawsuits where an entity is listed as a defendant divided by the employee estimate value. In one embodiment, the litigation ratio determination value is based on the number of active court cases where an entity is listed as a defendant, excluding duplicate listings. For example, the litigation data can be pulled from an online database (e.g., Lexis Nexis or received as a file from a third party (e.g., local court archives)). At 224, the process 200 uses one or more adaptive filters (discussed above) that use one or more of a Laplace smoothing algorithm, a Z-scoring algorithm, and/or a percentiler algorithm to output a litigation category score determination at 226 for each entity. As described below, the litigation category score determination is used by the compliance component 104 to determine the overall compliance score at 228 and the process 200 ends at 230.

The overall compliance score of an embodiment is based on a weighted sum of one or more of the licensing category score determination, the complaint category score determination, and/or the litigation category score determination. The weightings can be adjusted or tuned as scores are calculated and/or as additional data is compiled and/or discarded by the process 200. For example, scoring feedback and/or additional collected data can be used to adjust one or more of the weightings to influence how a particular category affects the overall compliance score.

Figure 7:
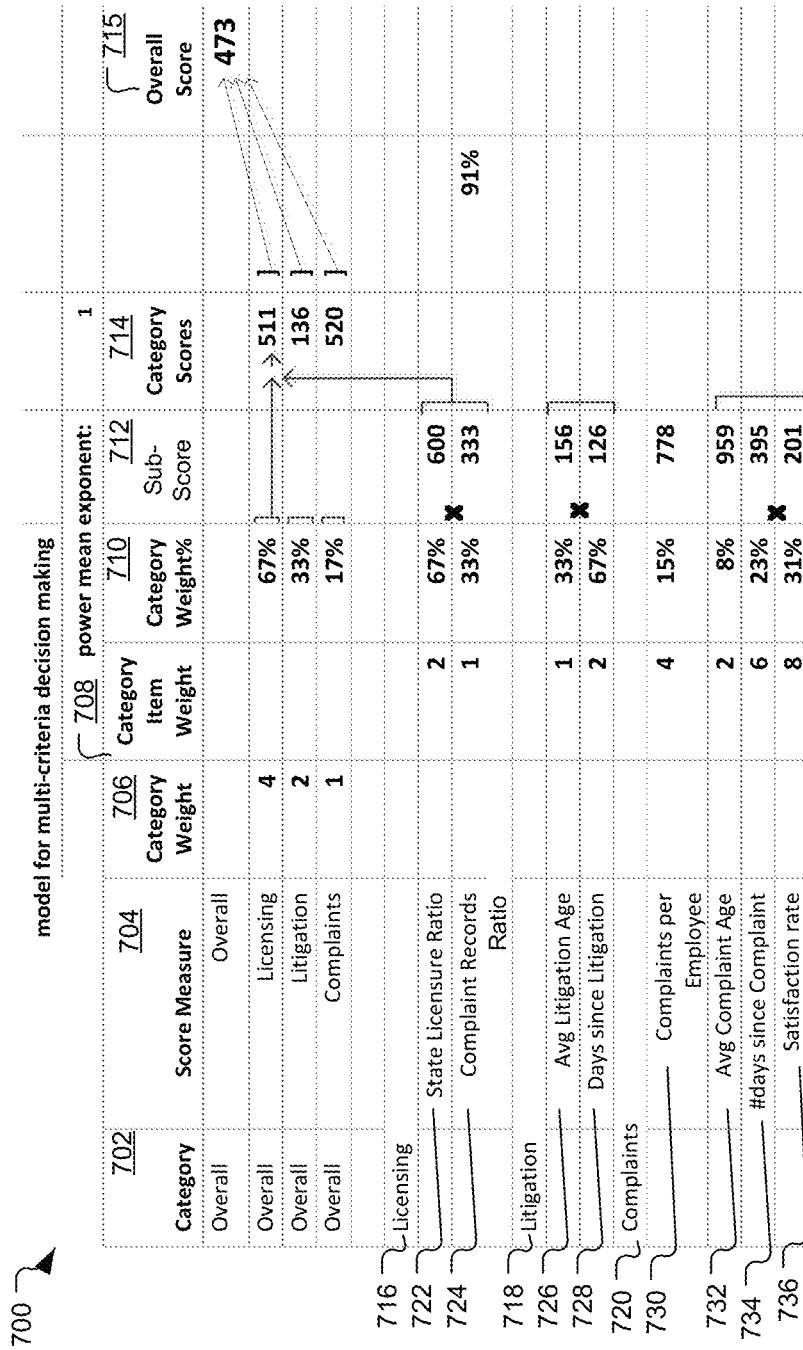
FIG. 7 depicts an exemplary compliance table according to an embodiment.

As an example, a higher weight may be assigned to one or both of the litigation and licensing categories while a lower weight is assigned to the complaint category due to few complaints and positive resolutions. As another example, a higher weight may be assigned to one or both of the complaint and licensing categories while a lower weight is assigned to the litigation category due to no recent court cases found for a particular collection agency. Accordingly, the process 200 is tunable and adaptive due in part to adjustable weightings and use of feedback and/or additional (or discarded) data to adjust the overall compliance score and/or sub-scores. The tunable and adaptive process 200 tends to efficiently use processing and memory resources without performing extraneous calculations. FIG. 7 provides a number of example sub-categories having corresponding sub-scores and weightings for use in computing an overall compliance score.

Figure 3:
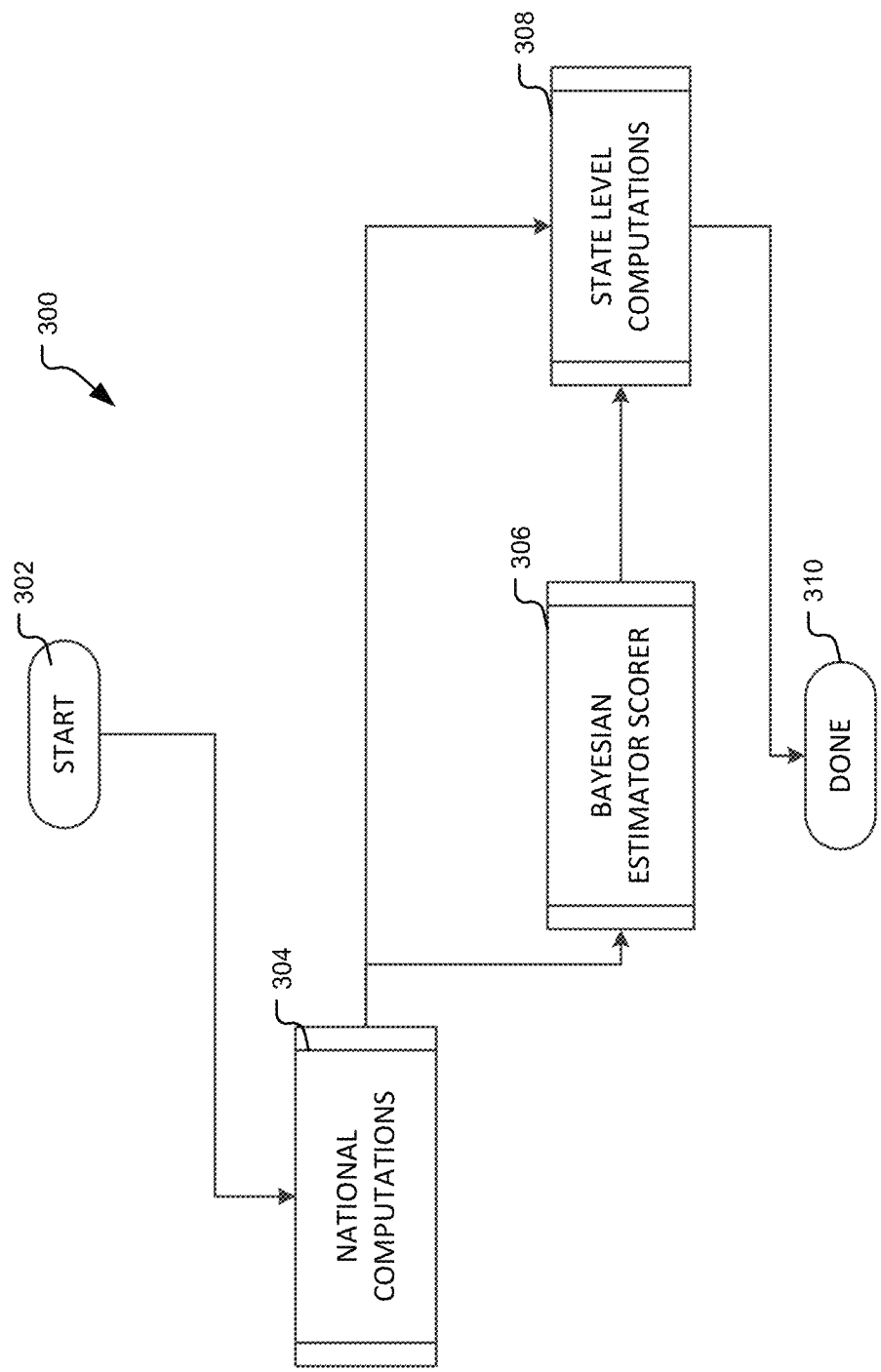
FIG. 3 is a flow diagram that depicts a process to provide national and state level computations as part of providing a compliance and/or risk assessment according to an embodiment.

FIG. 3 is a flow diagram that depicts a process 300 to provide national and state level computations as part of providing a compliance and/or risk assessment, according to an embodiment. The process 300 operates to provide a compliance and/or risk assessment for each entity under consideration based in part on a licensing category, a litigation category, and/or a complaint category (e.g., consumer sentiment category). As shown in FIG. 3, the process 300 starts at 302 and proceeds to 304 to provide nationwide or national risk assessment values for each entity based on the licensing category, litigation category, and/or complaint category.

The national risk assessment values of one embodiment are based on compliance score determinations for the entire United States. The national computations are input to a Bayesian estimator scorer at 306 and as an input to the state level computations at 308. The state level computations of an embodiment provide a compliance and/or risk score determination for each entity under consideration for each state of the United States and/or on a regional basis. Each computation can be performed on a per state basis and tracked longitudinally over time.

According to an embodiment, the process 300 uses a national score as apriori information to influence individual state scores. The pieces of evidence in a given state are combined with the evidence from the national model:

$$S_s = (W_s * S_n + W_s * S_s)/(W_n + W_s)$$

where s corresponds to national or state scores and w corresponds to the national weights or state weights of evidence. The process 300 ends at 310.

Figure 4:
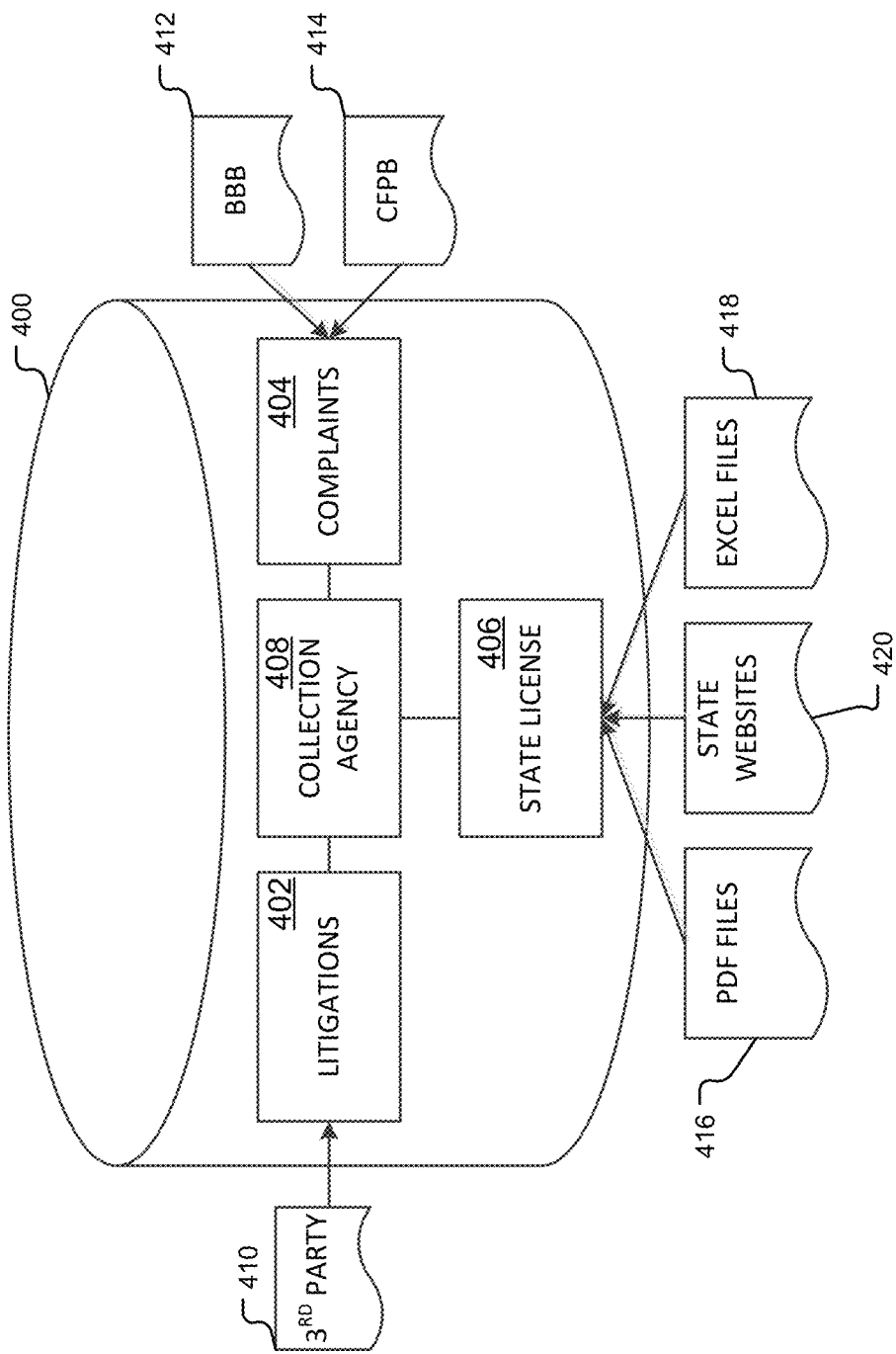
FIG. 4 is a block diagram that depicts an exemplary database for use in storing information used in adaptively quantifying compliance and/or risk according to an embodiment.

FIG. 4 is a block diagram that depicts an exemplary database 400 (e.g., database 106) for use in storing information used in adaptively quantifying compliance and/or risk for a number of collection agencies. As shown in FIG. 4, database 400 includes litigation records 402, complaint records 404, and state license records 406 associated with collection agency 408, but is not so limited. It will be appreciated that database 400 is configured to include associated litigation records 402, complaint records 404, and state license records 406 for a plurality of collection agencies. For illustration purposes, records associated with one collection agency 408 are described.

For the illustrated example, information collected from a third party system 410, such as an online legal database or a court website, is used to populate the litigation records 402 associated with collection agency 408. In one embodiment, the litigation records 402 include records that correspond to a name of the collection agency 408 listed as a defendant in a court case. Information collected from the Better Business Bureau 412 and the Consumer Financial Protection Bureau 414 can be used to populate the complaint records 404 associated with collection agency 408. Information collected from pdf files 416, excel files 418, and/or other files as well as information collected from state licensing websites 420 can be used to populate the state license records 406 associated with collection agency 408. As described above, information can be pulled from database 400 when assessing compliance and/or risk for collection agency 408.

Figure 5:
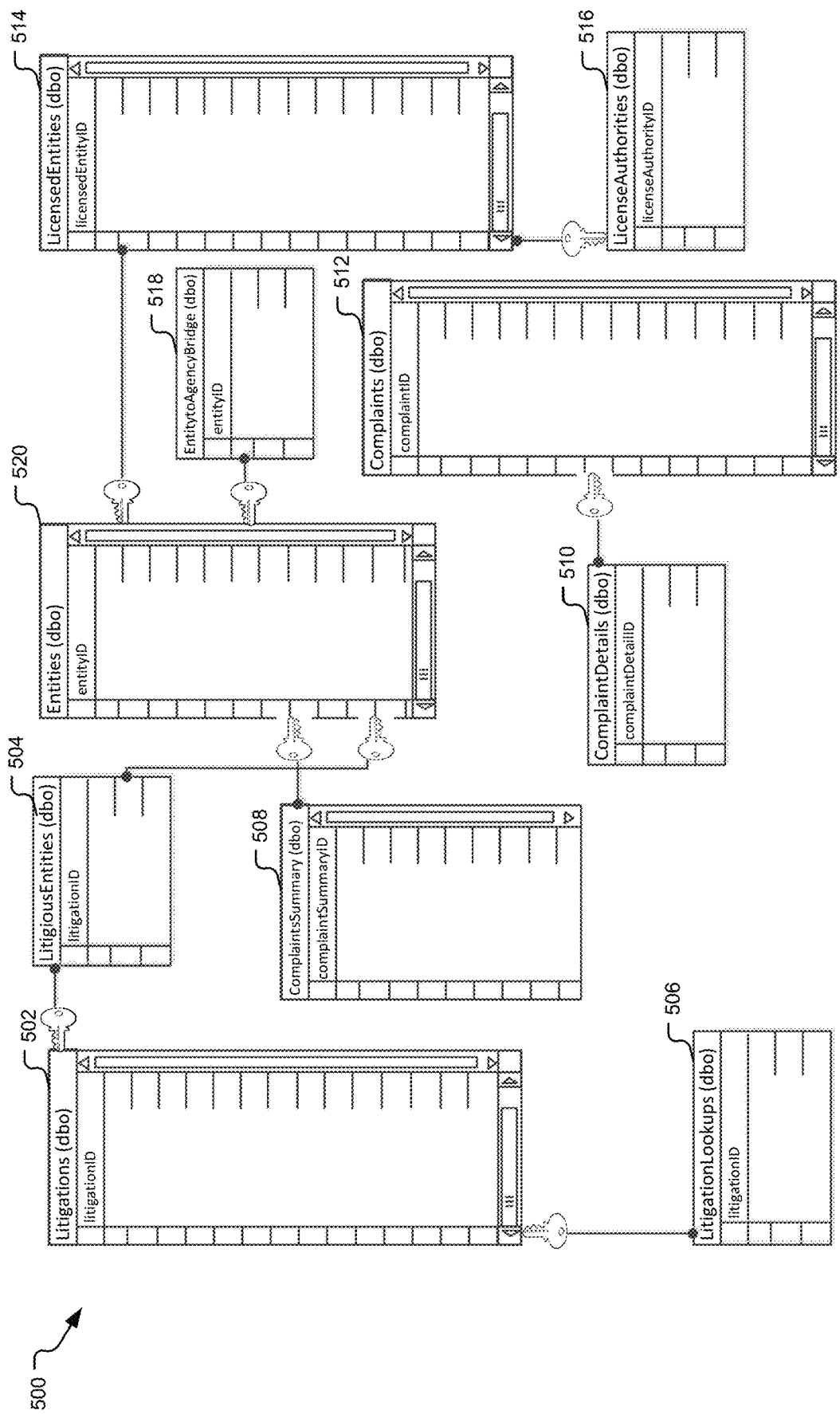
FIG. 5 is a block diagram that depicts a database layout architecture according to an embodiment.

FIG. 5 is a block diagram that depicts a database layout architecture 500 according to an embodiment. As shown in FIG. 5, database layout architecture 500 includes a litigations table 502, a litigious entities table 504, a litigation lookups table 506, a complaints summary table 508, a complaint details table 510, a complaints table 512, a licensed entities table 514, a license authorities table 516, an entity to agency bridge table 518, and an entities table 520.

Tables 502-520 can be used by system 100 to populate database 106 or 400 and track compliance and/or risk factors for the various entities under examination as part of selecting an entity, such as a collection agency for example, to perform a particular service.

Figure 6:
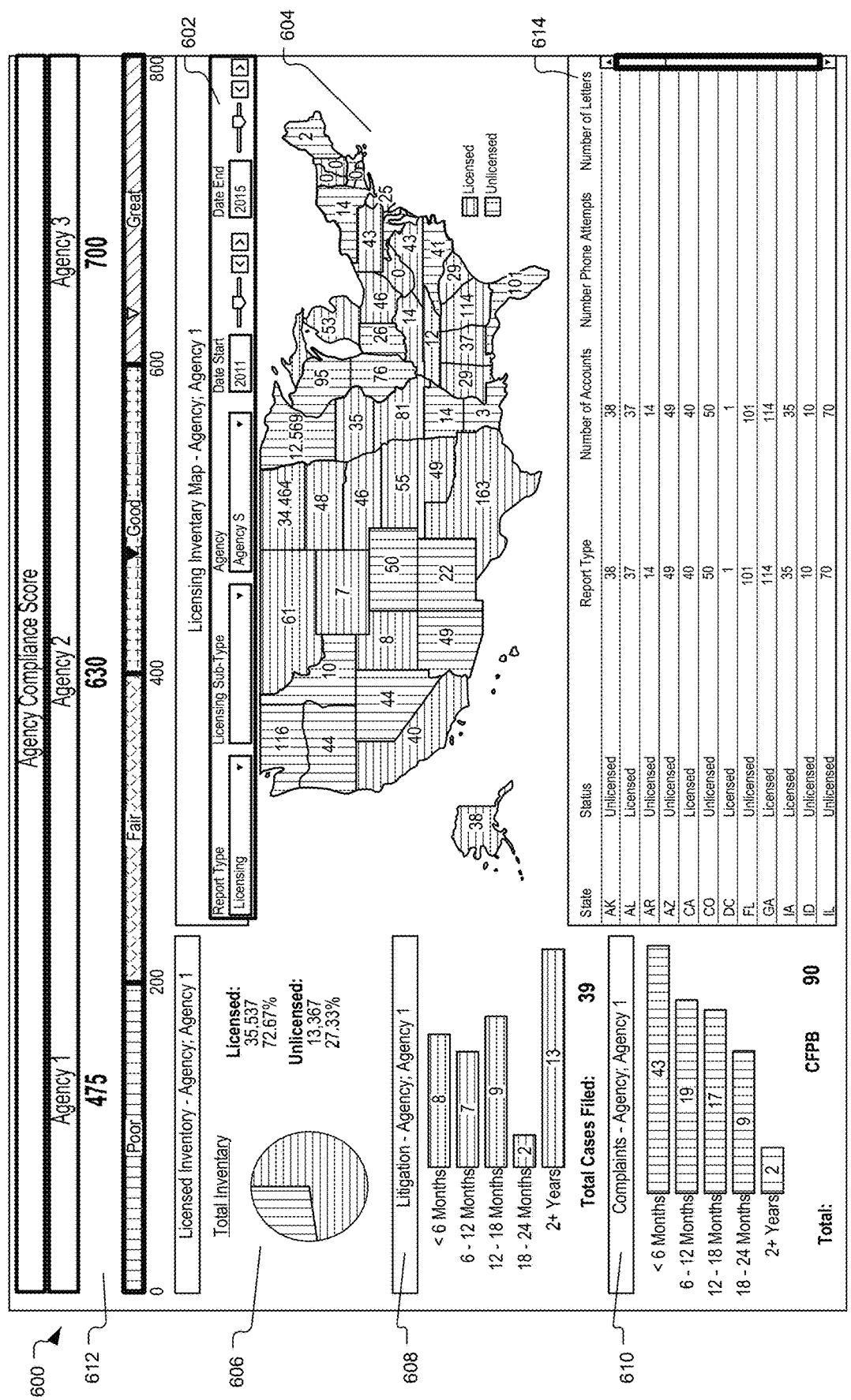
FIG. 6 depicts an exemplary dashboard user interface (UI) according to an embodiment.

FIG. 6 depicts an exemplary dashboard user interface (UI) 600 populated with data output by the reporting component 114. Information stored in database 106 and/or output from the compliance component 104 can be used as inputs to the reporting component 114 to populate various graphics of the dashboard UI 600. As shown in FIG. 6, the dashboard UI 600 provides a comparison of agency compliance scores for a plurality of collection agencies. Controls 602 allow a user to select a report type, a licensing sub-type, an agency, and start and end dates, but are not so limited. Once values are selected using the controls 602, the dashboard UI 600 populates map graphic 604 with information pertaining to whether an agency (Agency 1 for this example) is licensed or unlicensed in each state.

Dashboard UI 600 also provides a pie chart graphic 606 populated with the total inventory (e.g. accounts) associated with an agency and broken out according to whether the agency is licensed or unlicensed and how much inventory is associated with each of the licensed category and the unlicensed category. Dashboard UI 600 also includes a bar graphic 608 populated with litigation information and a bar graphic 610 populated with complaints information associated with the agency.

Graphic 612 of the dashboard UI 600 provides compliance score information for agencies being considered to perform a service. For this example, compliance scores that are between about zero (0) and two hundred (200) are considered poor, being in a highest risk category, compliance scores that are between about two hundred (200) and four hundred (400) are considered fair, being in a moderate risk category, compliance scores that are between about four hundred (400) and six hundred (600) are considered good, being in a low risk category, and compliance scores that are between about six hundred (600) and eight hundred (800) are considered great, being in a lowest risk category. It will be appreciated that less risk to reputation and goodwill is typically involved when using a collection agency having a higher compliance score (e.g., greater than 400). Graphic 614 of the dashboard UI 600 provides a listing of compliance information broken out by state, license status, report type, number of accounts, number of phone attempts, and number of letters sent associated with collections.

FIG. 7 depicts an exemplary compliance table 700 populated with data output by the reporting component 114. As shown in FIG. 7, table 700 includes a category column 702, a score measure column 704, a category weight column 706, an item weight column 708, a category weight percentage column 710, a sub-score column 712, and a category score column 714. For illustration purposes, columns 702-714 include exemplary values associated with a compliance and/or risk assessment. An overall compliance score 715 is calculated based on the category weight percentages 710 and category scores 714 for each of the licensing, litigation, and complaint (also referred to as consumer sentiment) categories. The category scores 714 are based on the sub-scores 712.

Table 700 is further broken out into a licensing section 716, a litigation section 718, and complaints section 720. Licensing section 716 is further broken out into sub-categories including a state licensure ratio 722 and a compliant records ratio 724. The state licensure ratio 722 variable tracks the number of states where an entity is licensed. The compliant records ratio 724 variable tracks the number of records that are compliant according to whether an agency is licensed or unlicensed for any given state.

Litigation section 718 is further broken out into sub-categories including an average litigation age 726 and a number of days since litigation 728. The average litigation age 726 variable tracks the average age of a particular court case and the number of days since litigation 728 variable tracks a number of days since a court case was filed.

Complaints section 720 is further broken out into complaints per employee 730, an average complaint age 732, a number of days since a complaint 734, and a satisfaction rate 736. The complaints per employee 730 variable tracks the number of complaints per employee of a particular entity, the average complaint age 732 variable tracks the average age of each complaint lodged for the particular entity, the number of days since a complaint 734 variable tracks the number of days since a complaint was lodged for the particular entity, and a satisfaction rate 736 variable tracks the number of complaints that were successfully addressed by the particular entity.

As discussed above, the category weights 710 can be set apriori for the overall and/or sub-categories and tuned as additional information is collected and/or as information is discarded. For this example, the licensing category has the highest weight due in part to the importance attached to the category. The complaints category has the lowest weight due in part to a lower amount of importance attached to the category for this example.

The state licensure ratio 722 sub-category of the licensing section 716 has been assigned a higher weight as compared to the weighting applied to the compliant records ratio 724 due in part to the higher importance attached to the state licensure ratio 722 variable for this example. The number of days since litigation 728 sub-category of the litigation section 718 has been assigned a higher weight as compared to the weighting applied to the average litigation age 726 variable due in part to the higher importance attached to the number of days since litigation 728 variable for this example. The satisfaction rate 736 sub-category of the complaints section 720 has the highest weight applied, followed by the number of days since a complaint 734 sub-category, complaints per employee 730 sub-category, and the average complaint age 732 sub-category for this example. Scores 712 are calculated based on the weighting applied to each overall category and sub-category variable as shown in FIG. 7.

Figure 8:
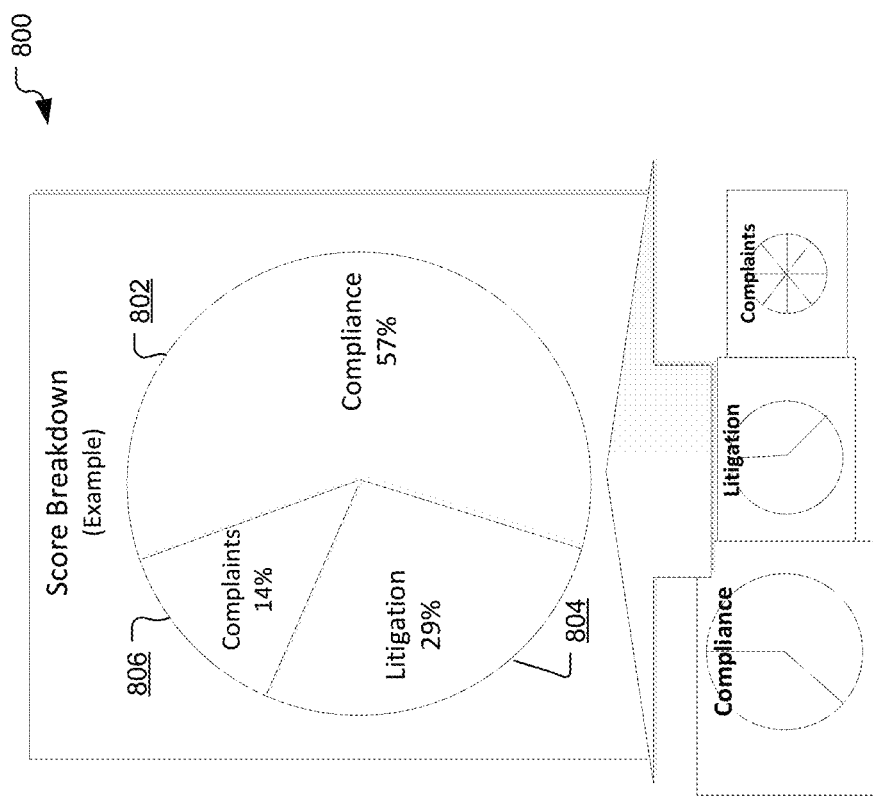
FIG. 8 depicts an exemplary pie chart graphic according to an embodiment.

FIG. 8 depicts an exemplary pie chart graphic 800 populated with data output by the reporting component 114. As shown in FIG. 8, the pie chart graphic 800 is broken out into a compliance section 802, a litigation section 804, and a complaints section 806 to provide a user with an at-a-glance overall assessment of the overall categories and sub-categories for a particular entity.

Figure 9:
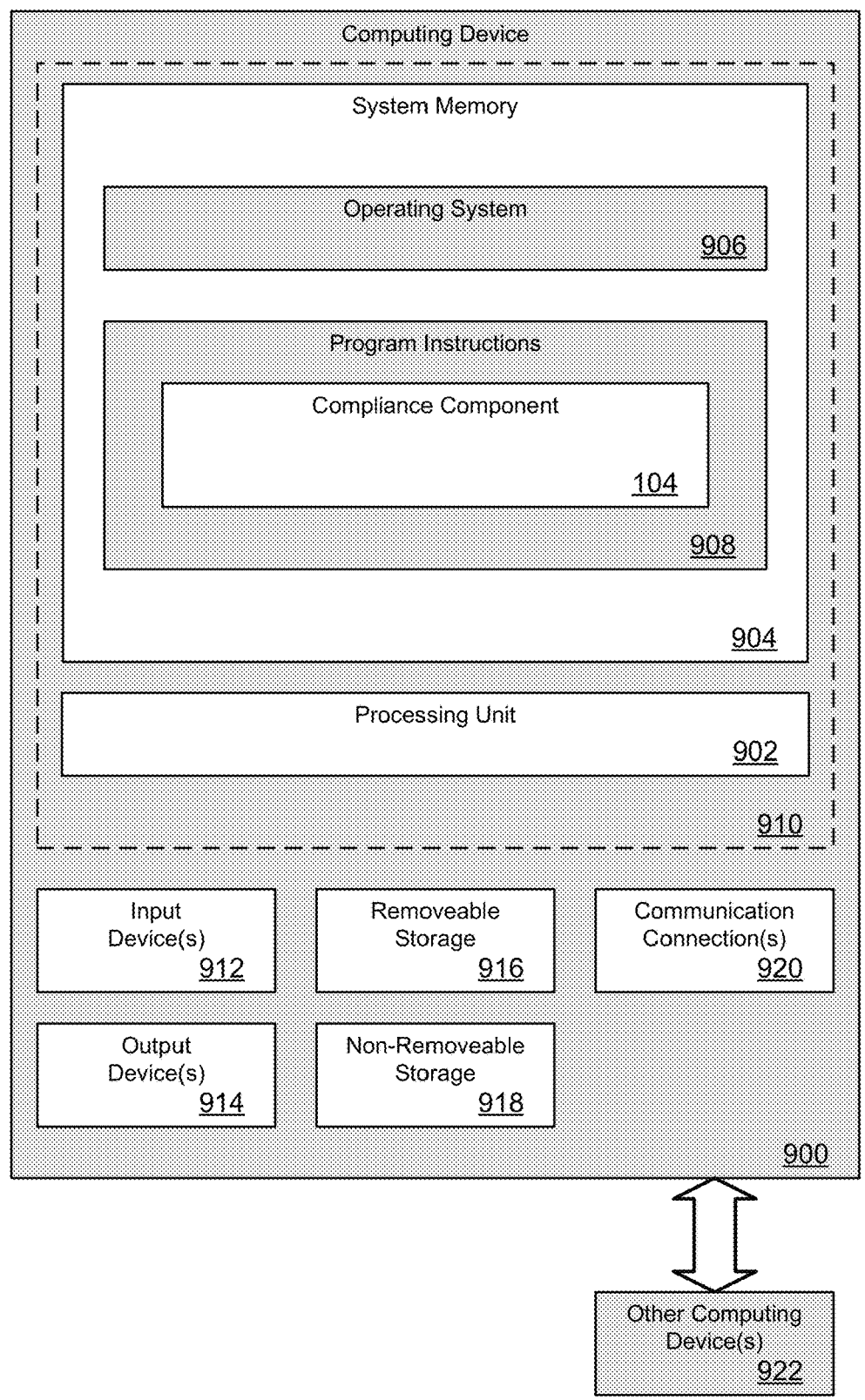
FIG. 9 is a block diagram illustrating physical components of an example computing device with which aspects may be practiced.

FIG. 9 is a block diagram illustrating physical components of an example computing device 900 with which aspects may be practiced. The computing device 900 may include at least one processing unit or processor 902 and a system memory 904. The system memory 904 may comprise, but is not limited to, volatile (e.g. random access memory (RAM)), non-volatile (e.g. read-only memory (ROM)), flash memory, or any combination thereof. System memory 904 may include operating system 906, one or more program instructions 908 including the compliance component 104, and may include remote control functionality including an automated reconnect agent executable having sufficient computer-executable instructions, which when executed, perform functionalities and features as described herein.

Operating system 906, for example, may be suitable for controlling the operation of computing device 900 and for instantiating a communication session between one or more local or remote systems/devices. Furthermore, aspects may be practiced in conjunction with a graphics library, other operating systems, or any other application program and is not limited to any particular application or system. This basic configuration is illustrated by those components within a dashed line 910. Computing device 900 may also include one or more input device(s) 912 (keyboard, mouse, pen, touch input device, etc.) and one or more output device(s) 914 (e.g., display, speakers, a printer, etc.).

The computing device 900 may also include additional data or memory storage devices (removable or non-removable) such as, for example, magnetic disks, optical disks, or tape. Such additional storage is illustrated by a removable storage 916 and a non-removable storage 918. Computing device 900 may also contain a communication connection 920 that may allow computing device 900 to communicate with other computing devices 922, such as over a network in a distributed computing environment, for example, an intranet or the Internet. Communication connection 920 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects described herein may be used in various distributed computing environments where tasks are performed by remote processing devices that are linked through a communications network. Aspects described herein may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 900 or any other computing devices 922, in combination with computing device 900, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A tunable computer implemented method comprising:
    collecting litigation information associated with one or more entities from a first data source;
    collecting licensure information associated with the one or more entities from a second data source;
    collecting consumer sentiment information associated with the one or more entities from a third data source;

tuning one or more adaptive filters as part of adaptively determining a stratified risk evaluation associated with each of the one or more entities including:
  applying a first weight to a litigation factor corresponding to the litigation information;
  applying a second weight to a licensure factor corresponding to the licensure information; and
  applying a third weight to a complaint factor corresponding to the consumer sentiment information;
applying the one or more adaptive filters to output a licensing category score, a complaint category score, and a litigation category score to generate a stratified score that includes the licensing category score, the complaint category score, and the litigation category score for each of one or more entities to quantify an amount of risk of using the one or more entities to perform a service;
maintaining, in a data repository, the stratified score for each of the one or more entities, and the litigation information, the licensure information, and the consumer sentiment information for each of the one or more entities on a nationwide and/or state by state basis; and
generating a dashboard user interface (UI) that includes a plurality of display portions with data from the data repository enabling comparison of the one or more entities including a first display portion that includes the stratified score for each of the one or more entities, a second display portion that includes license details on a state-by-state basis for a selected entity, a third display portion that includes litigation details over one or more time periods for the selected entity, and a fourth display portion that includes complaint details over the one or more time periods for the selected entity.

2. The method of claim 1, further comprising tuning the one or more adaptive filters to modify the stratified score for each of the one or more entities by changing one or more weightings on one or more of an overall litigation score or sub-score, an overall licensure score or sub-score, and/or an overall consumer sentiment score or sub-score.

3. The method of claim 2, further comprising calculating sub-scores for one or more of a state licensure ratio, a compliant records ratio, an average litigation age, a number of days since litigation, a complaints per employee, an average complaint age, a number of days since a complaint, and a satisfaction rate.

4. The method of claim 1, further comprising:
  receiving information associated with a collection agency;
  determining a benefit of using additional information from a third party for the collection agency; and
  obtaining financial information of payments received by the collection agency associated with services provided by a healthcare provider.

5. The method of claim 1, further comprising searching a third party source for the litigation information associated with an entity, wherein the searching is based on use of a registered agency name of the entity including a previously registered company name if available or a company alias including a doing-business-as name if available.

6. The method of claim 5, further comprising associating the entity with the litigation information by:
  removing duplicates based on a court case number;
  ranking defendants based on order in a defendant list;
  matching the litigation information based on the registered agency name of the entity; and
  maintaining a database of entities comprising collection agencies with associated litigation.

7. The method of claim 1, further comprising searching a state source for the licensure information associated with an entity, wherein the searching is based on use of a registered agency name of the entity including a previously registered company name if available or a company alias including a doing-business-as name if available.

8. The method of claim 7, further comprising selecting a single license for each state except in states that have multiple licensing requirements at the state and/or city level by selecting the single license according to rules including:
  determining if a name of the entity matches the registered agency name associated with the single license and assigning a highest priority for a match;
  determining a most recent license start date of an active license status associated with the single license; and
  determining a highest ranked license number associated with the single license in descending order and assigning a lowest priority for the highest ranked license number.

9. The method of claim 1, further comprising searching a third party source for the consumer sentiment information associated with an entity including one or more complaints directed at the entity, wherein the searching is based on use of a registered agency name including a previously registered company name if available or a company alias including a doing-business-as name if available.

10. The method of claim 1, further comprising providing a compliance report including:
  a nationwide compliance risk score for an entity;
  a state and/or regional compliance risk score for the entity;
  individual key factors influencing each of the compliance risk scores for the entity; or
  at least one sub-score associated with the litigation information, at least one sub-score associated with the licensure information, and/or at least one sub-score associated with the consumer sentiment information.

11. A tunable system comprising:
  a processor and memory, including executable instructions which, when executed by the processor, operate to:
    collect litigation information associated with one or more entities from a first data source;
    collect licensure information associated with the one or more entities from a second data source;
    collect consumer sentiment information associated with the one or more entities from a third data source;
    tune one or more adaptive filters as part of adaptively determining a stratified risk evaluation associated with each of the one or more entities that includes:
      application of a first weight to a litigation factor corresponding to collected litigation information;
      application of a second weight to a licensure factor corresponding to collected licensure information; and
      application of a third weight to a complaint factor corresponding to collected consumer sentiment information;
    apply the one or more adaptive filters to the collected litigation information, the licensure information, and the consumer sentiment information associated with one or more entities to adaptively determine a stratified score for each of the one or more entities according to output of a licensing category score, a complaint category score, and a litigation category score to quantify an amount of risk of using the one or more entities to perform a service;

maintain, in a data repository, the stratified score for each of the one or more entities, and the litigation information, the licensure information, and the consumer sentiment information for each of the one or more entities on a nationwide and/or state by state basis; and generate a dashboard user interface (UI) that includes a plurality of display portions with data from the data repository enabling comparison of the one or more entities including a first display portion that includes the stratified score for each of the one or more entities, a second display portion that includes license details on a state-by-state basis for a selected entity, a third display portion that includes litigation details over one or more time periods for the selected entity, and a fourth display portion that includes complaint details over the one or more time periods for the selected entity.

12. The system of claim 11, further to modify the stratified score for each of the one or more entities by adjusting one or more weightings on one or more of an overall litigation score or sub-score, an overall licensure score or sub-score, and/or an overall consumer sentiment score or sub-score.

13. The system of claim 11, further to:
search a third party source for the litigation information associated with an entity, wherein the search is based on use of a registered agency name of the entity including a previously registered company name if available or a company alias including a doing-business-as name if available;
remove duplicates based on a court case number;
rank defendants based on order in a defendant list;
match the litigation information based on the registered agency name of the entity; and
maintain a database of entities comprising collection agencies with associated litigation.

14. The system of claim 11, further to:
search a state source for the licensure information associated with an entity, wherein the search is based on use of a registered agency name of the entity including a previously registered company name if available or a company alias including a doing-business-as name if available;
select a single license for each state except in states that have multiple licensing requirements at the state and/or city level according to rules that:
determine if a name of the entity matches the registered agency associated with the single license and assigning a highest priority for a match;
determine a most recent license start date of an active license status associated with the single license; and
determine a highest ranked license number associated with the single license in descending order and assigning a lowest priority for the highest ranked license number.

15. The system of claim 11, further to search a third party source for the consumer sentiment information associated with an entity including one or more complaints directed at the entity, wherein the search is based on use of a registered agency name including a previously registered company name if available or a company alias including a doing-business-as name if available.

16. The system of claim 11, further to provide a compliance report that includes:
a nationwide compliance risk score for an entity;
a state and/or regional compliance risk score for the entity; and
individual key factors influencing each of the compliance risk scores for the entity; and
a sub-score for each of the litigation information, licensure information, and/or the consumer sentiment information.

17. A non-transitory computer readable medium that includes instructions that, when executed, operate to provide a tunable process that:
collects litigation information associated with one or more entities from a first data source;
collects licensure information associated with the one or more entities from a second data source; and
collects consumer sentiment information associated with the one or more entities from a third data source;
tunes one or more adaptive filters as part of adaptively determining a stratified risk evaluation associated with each of the one or more entities that includes:
application of a first weight to a litigation factor corresponding to the litigation information;
application of a second weight to a licensure factor corresponding to the licensure information; and
application of a third weight to a complaint factor corresponding to the consumer sentiment information;
applies the one or more adaptive filters to output a licensing category score, a complaint category score, and a litigation category score determination to generate a stratified score for each of one or more entities to quantify an amount of risk of using the one or more entities to perform a service;
maintains, in a data repository, the stratified score for each of the one or more entities, and the litigation information, the licensure information, and the consumer sentiment information for each of the one or more entities on a nationwide and/or state by state basis; and
generates a dashboard user interface (UI) that includes a plurality of display portions with data from the data repository enabling comparison of the one or more entities including a first display portion that includes the stratified score for each of the one or more entities, a second display portion that includes license details on a state-by-state basis for a selected entity, a third display portion that includes litigation details over one or more time periods for the selected entity, and a fourth display portion that includes complaint details over the one or more time periods for the selected entity.

18. The computer readable medium of claim 17 that includes instructions that, when executed, operate further to modify the stratified score for each of the one or more entities by adjusting one or more weightings on one or more of an overall litigation score or sub-score, an overall licensure score or sub-score, and/or an overall consumer sentiment score or sub-score.

* * * * *